United States Patent
Takahashi et al.

(10) Patent No.: US 6,176,245 B1
(45) Date of Patent: Jan. 23, 2001

(54) WEB CLEANING AND DESTATICIZING APPARATUS

(75) Inventors: Shinsuke Takahashi; Norio Shibata, both of Kanagawa (JP)

(73) Assignee: Fuji Photo Film Co., Ltd., Kanagawa (JP)

(*) Notice: Under 35 U.S.C. 154(b), the term of this patent shall be extended for 0 days.

(21) Appl. No.: 09/145,307

(22) Filed: Sep. 2, 1998

(30) Foreign Application Priority Data

Sep. 4, 1997 (JP) .................................................. 9-239903

(51) Int. Cl.$^7$ ........................................................ B08B 1/02
(52) U.S. Cl. ............................... 134/122 R; 134/64 R; 15/302; 15/309.1; 118/410
(58) Field of Search ..................... 134/15, 122 R, 134/122 P, 64 P, 64 R; 118/428, 400, 73, 74, 423, 416, 413, 410; 427/310, 430; 15/97.1, 103.5, 102, 121, 256.5, 302, 309.1

(56) References Cited

U.S. PATENT DOCUMENTS

| | | | |
|---|---|---|---|
| 3,679,476 | * 7/1972 | Oosterhout et al. | 118/413 X |
| 3,956,740 | * 5/1976 | Ishiwata et al. | 134/64 X |
| 4,369,731 | * 1/1983 | Damrau | 118/413 X |
| 4,577,362 | * 3/1986 | Tanaka et al. | 15/256.5 |
| 4,688,516 | * 8/1987 | Sommer | 118/413 X |
| 4,887,623 | * 12/1989 | Sugiyama et al. | 134/122 X |
| 4,944,808 | * 7/1990 | Sugiyama et al. | 134/64 X |
| 5,294,259 | * 3/1994 | Canestaro et al. | 134/64 R |

FOREIGN PATENT DOCUMENTS 62-65872 3/1987 (JP) .

* cited by examiner

Primary Examiner—Laura Edwards
(74) Attorney, Agent, or Firm—Sughrue, Mion, Zinn, Macpeak & Seas, PLLC

(57) ABSTRACT

In a web cleaning and destaticizing apparatus, an upper surface of a front edge is shaped into a curve with a large radius of curvature so that a cleaning solution applied onto a surface of a web W can be smoothed. An upper surface of a doctor blade is shaped into a curve with a small radius of curvature so that a great part of the cleaning solution SOL1 smoothed by the upper surface of the front edge can be scraped off into a front slit 24. An upper surface of a back edge 23 is formed so that an undercoat solution can be applied onto the surface of the web just after the great part of the cleaning solution is scraped off by the upper surface of the doctor blade 22. Accordingly, the allowable range of web incident angle can be widened by the front edge, so that not only the cleaning solution can be scraped off by the doctor blade without scattering in the surrounding directions but also static electricity accumulated can be eliminated rapidly and efficiently by the undercoat solution.

10 Claims, 3 Drawing Sheets

WEB CLEANING AND DESTATICIZING APPARATUS

BACKGROUND OF THE INVENTION

1. Field of the Invention

The present invention relates to a web cleaning and destaticizing apparatus for removing deposits such as fine dust, etc., deposited on a surface of a continuously running web. More particularly, the present invention relates to a web cleaning and destaticizing apparatus in which dust on a surface of the web is removed by a cleaning solution just before the coating composition is applied onto the surface of the web.

Incidentally, the terminology "web" used in the present invention generally includes a flexible belt-like member which has a width in a range of from 0.3 to 2 m, a length in a range of from 45 to 15,000 m and a thickness in a range of from 3 to 200 μm, and which is formed of: plastic film made of such as polyethylene terephthalate, polyethylene-2, 6-naphthalate, cellulose diacetate, cellulose triacetate, cellulose acetate propionate, polyvinyl chloride, polyvinylidene chloride, polycarbonate, polyimide, polyamide, aramid, or the like; paper; paper applied or laminated with α-polyolefin having 2–10 carbons such as polyethylene, polypropylene, ethylene-butene copolymer, or the like; metal foil such as aluminum, copper, tin, or the like. The terminology "web" also includes a belt-like member which use an aforementioned belt-like member as a base material and have a finished layer formed on the surface of the member.

Further, the web is coated with a coating composition in accordance with the purpose of use. For example, a photographic light-sensitive coating composition, a magnetic coating composition, a surface protective coating composition, an antistatic coating composition, a lubricating coating composition, or the like is applied onto a surface of an original web. After being dried, the original web is cut into pieces each having a required width and a required length. Typical products of such webs may be photographic film, photographic printing paper, magnetic tape, magnetic disk, etc.

2. Description of the Related Art

As a conventionally well-known web dust removing apparatus, there are some types of apparatus. One is a doctor blade type disclosed in Japanese Patent Unexamined Publication No. Sho. 62-65872 as shown in FIG. 4. Another is a rotary-rod-bar-equipped extruder type as shown in FIG. 5. Before a dust removing process, a web cleaning solution SOL1, mainly containing an organic solvent, is applied onto one surface of a web W. In each type of web dust removing apparatus, the web cleaning solution SOL1 is removed by a doctor blade 2 in FIG. 4 or a rotary rod bar 12 in FIG. 5 at the upstream position of the running direction of the web. While the web cleaning solution SOL1 is removed, fine deposits on the one surface of the web W are also removed together with the web cleaning solution SOL1.

A conventional web dust removing apparatus 1, which is doctor blade type, is shown in FIG. 4. In the conventional doctor blade type, a doctor blade 2 is provided with a relatively small width and a relatively small radius of curvature R in a range of from about 2 to 30 mm. On the upstream side of the curved upper surface of the doctor blade 2, a cutting edge is provided. The web W coated with the web cleaning solution SOL1 is guided to run in the direction of the arrow A, and a web incident angle α is formed in a range of from about 0.5° to 2° where the web W and a tangential line of the cutting edge cross. Then, fine deposits DP on one surface of the web W are scraped off together with a part of the web cleaning solution SOL1 applied onto the web. After being collected into a solution collection groove 3, which is disposed below the doctor blade 2, the web cleaning solution SOL1 is discharged to a cleaning solution recycle system (not shown).

On the other hand, a FIG. 5 shows a web dust removing apparatus 10, which is a conventional rotary-rod-bar-equipped extruder type. In the conventional rotary-rod-bar-equipped extruder type, a rotary rod bar 12 is provided above a block on the upstream side, which forms a slit 15 communicated with a pocket 14 provided, by holing, in the inside of an extruder 11. The rotary rod bar 12 is rotatable in a direction B reverse to the running direction A of the web W. Then, fine deposits DP on one surface of the web W are scraped off together with a part of the web cleaning solution SOL1 by the outer circumferential surface of the rotary rod bar 12. After being collected into a solution collection groove 3 disposed at a lower portion of the extruder 11, the web cleaning solution SOL1 is discharged into a cleaning solution recycle system (not shown).

Further, in the conventional web dust removing apparatus 10 of rotary-rod-bar-equipped extruder type, electrostatic charges after the scraping can be suppressed, while the electrostatic charges are expected in the conventional web dust removing apparatus 1 of doctor-blade type. In order to suppress the electrostatic charges, the following design is employed. First, an undercoat solution (SOL2) is supplied to a pocket 14. The undercoat solution (SOL2) contains compositions equivalent to those of the web cleaning solution SOL1 or contains additives in a solvent of the same kind as that of the cleaning solution (SOL1). Second, a back edge 16 is provided on a upper surface of the block of the downstream side and forms a slit 15. Then, the undercoat solution (SOL2) is introduced through the slit 15 and into the space between the back edge 16 and the web W, which has passed the rotary rod bar 12. After being introduced, the undercoat solution (SOL2) is applied onto the surface of the web W to thereby attain destaticization.

However, in the conventional web dust removing apparatus 1 of doctor blade type, the running speed of the web W can be increased in order to improve dust-removing effect. increasing the improvement in the dust-removing effect results in a greater quantity of the web cleaning solution SOL1 to be scraped off. This means the curved upper surface of the doctor blade 2 is arranged to the place which is more closer to the one surface of the web W. The above-described increment of the speed and arrangement of the doctor blade 2 result in the cleaning solution SOL1 scattering in the surrounding directions easily, and a strong shear force acts on the web W. By this strong shear force, the web W passing the doctor blade 2 is electrostatically charged abnormally large amount. As a result, there was a fear that it would cause a problem by attracting and absorbing floating dust, or the like.

Further, in the conventional web dust removing apparatus 10 of rotary-rod-bar-equipped extruder type, the running speed of the web W and the quantity of the web cleaning solution SOL1 to be scraped off can be increased so as to improve dust-removing effect. However, as in the case of the conventional web dust removing apparatus 1 of doctor blade type, the increment of the speed and the increment of the quantity result in the cleaning solution SOL1 scattering in the surrounding directions easily. As a result, the scattered solution deposits on the surface of the web W again, and lowers the dust-removing effect. Furthermore, this might cause a trouble of lowering the quality in the coating surface because of pinholes, or the like.

Further, in each of the conventional web dust removing apparatus 1 and 10, incidental equipment are complicated and expensive in order to accurately set the web incident angle α of the web W with respect to the doctor blade 2 or the rotary rod bar 12, the quantity of application of the web cleaning solution SOL1, etc. If all those settings are done mainly by human hand, human setting errors might cause an abnormal increase of electrostatic charges.

SUMMARY OF THE INVENTION

The present invention is designed to solve the problems in the prior art and an object thereof is to provide a web cleaning and destaticizing apparatus in which both dust-removing effect and destaticizing effect are improved more greatly with a very compact structure.

The above object of the present invention can be achieved by a web cleaning and destaticizing apparatus characterized in that: a front edge, a front slit, a doctor blade, a back slit and a back edge are integrally and continuously disposed along the running direction of a web which has one surface preliminarily coated with a cleaning solution and which is running continuously among webbing guide rollers in a condition that a predetermined tension is given to the web; the front edge, the doctor blade and the back edge have respective surfaces with radii of curvature respectively for pressing the surface of the web to permit the running of the web while making the web curve upward through a layer of the applied cleaning solution so that the radius of curvature of the upper surface of the front edge is set to be larger than the radius of curvature of the upper surface of the doctor blade; and immediately after a part of the applied cleaning solution is scraped off from the web by the doctor blade, an undercoat solution supplied from the back slit is applied onto a surface of the layer of the remaining cleaning solution by the back edge.

In the present invention, preferably, the undercoat solution contains compositions of the same kind as those of the cleaning solution or contains additives in a solvent of the same kind as the cleaning solution.

In the present invention, preferably, the quantity of application of the undercoat solution is at least 5 cc/m$^2$.

In the present invention, preferably, the radius of curvature R2 of the upper surface of the front edge is set to have the relation R2>5R1 with respect to the radius of curvature R1 of the upper surface of the doctor blade.

In the present invention, preferably, the upstream-side end portion of the upper surface of the front edge is chamfered.

The web cleaning and destaticizing apparatus according to the present invention has a front edge, a front slit, a doctor blade, a back slit and a back edge which are integrally arranged in order along the running direction of the web which has one surface preliminarily coated with the cleaning solution and which is stretched among the web guide rollers to continuously run with a predetermined amount of tension. The front edge, the doctor blade and the back edge have respective upper surfaces which press, in cooperation with, the surface of the web so as to permit the web to run while the web is curved slightly upward. The upper surface of the front edge is shaped into a curve with a relatively large radius of curvature so as to be able to smooth the cleaning solution applied onto the surface of the web. The upper surface of the doctor blade is shaped into a curve with a relatively small radius of curvature so as to be able to scrape off a great part of the cleaning solution, which has been smoothed by the upper surface of the front edge, into the front slit. The upper surface of the back edge is formed so as to be able to apply the undercoat solution, which is supplied through the back slit, onto the surface of the web just after a great part of the cleaning solution is scraped off by the upper surface of the doctor blade. The allowable range of the web incident angle α is enlarged by the front edge, and the cleaning solution which is scraped off by the doctor blade is collected into the front slit without scattering in the surrounding directions.

Further, the undercoat solution is applied onto the surface of the web by the back edge just after the web has passed the upper surface of the doctor blade, so that static electricity accumulated by the scraping-off of the cleaning solution is eliminated rapidly and efficiently by the undercoat solution.

Further, the undercoat solution containing compositions equivalent to those of the cleaning solution or containing additives in a solvent of the same kind as that of the cleaning solution is applied to the web cleaning and destaticizing apparatus according to the present invention, so that the compatibility between the undercoat solution and the cleaning solution slightly remaining on the surface of the web and the wetness of another coating solution applied by a coater in the downstream side is kept and accelerated.

Further, the undercoat solution is applied to the web cleaning and destaticizing apparatus according to the present invention by a quantity of application of at least 5 cc/m$^2$, so that static electricity accumulated due to the scrape of the cleaning solution is eliminated more rapidly and more efficiently.

Further, the radius of curvature R2 of the upper surface of the front edge in the web cleaning and destaticizing apparatus according to the present invention is set to have the relation R2≧5R1 with respect to the radius of curvature R1 of the upper surface of the doctor blade, so that the smoothing action of the cleaning solution due to the front edge can be guaranteed more surely.

Further, the incident angle of the web with respect to the upper surface of the front edge in the web cleaning and destaticizing apparatus according to the present invention is set to be within a range of from −7° to 5° with respect to a tangential line at the upstream side end portion of the upper surface of the front edge (in which "−" indicates below the tangential line, and "+" indicates above the tangential line), so that the allowable range of the incident angle of the web is widened so that the apparatus set up easily by manual operation.

Further, the upstream side end portion of the upper surface of the front edge in the web cleaning and destaticizing apparatus according to the present invention is C-chamfered or R-chamfered, so that not only the setting of the incident angle of the web is made easier but also the occurrence of scratches caused by the contact between the upstream side end portion and the incident web is suppressed.

DETAILED DESCRIPTION OF THE PREFERRED EMBODIMENTS

Figure 1:
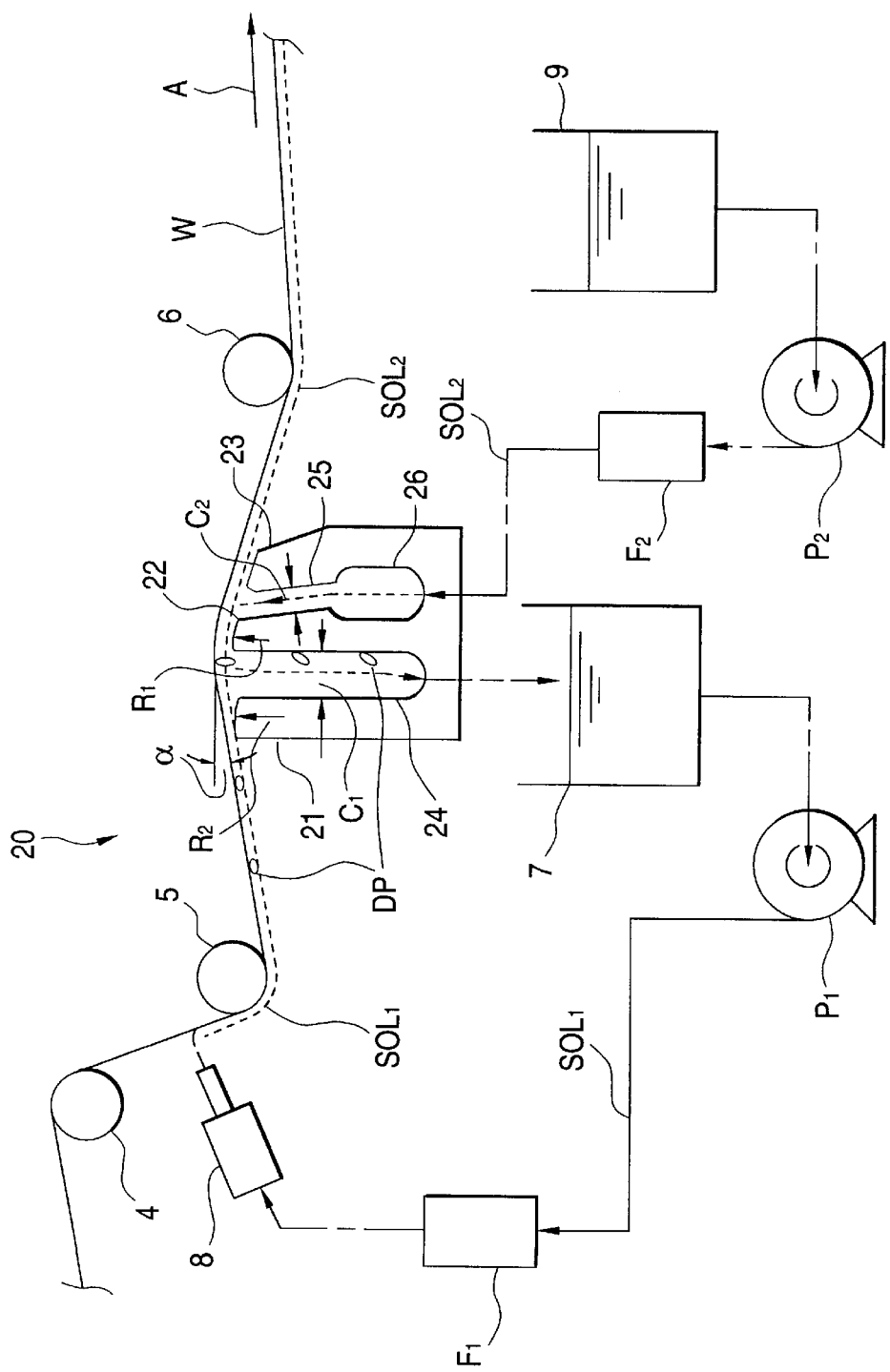
FIG. 1 is a schematic view diagrammatically showing a main part of a web cleaning and destaticizing apparatus according to the present invention.
Figure 2:
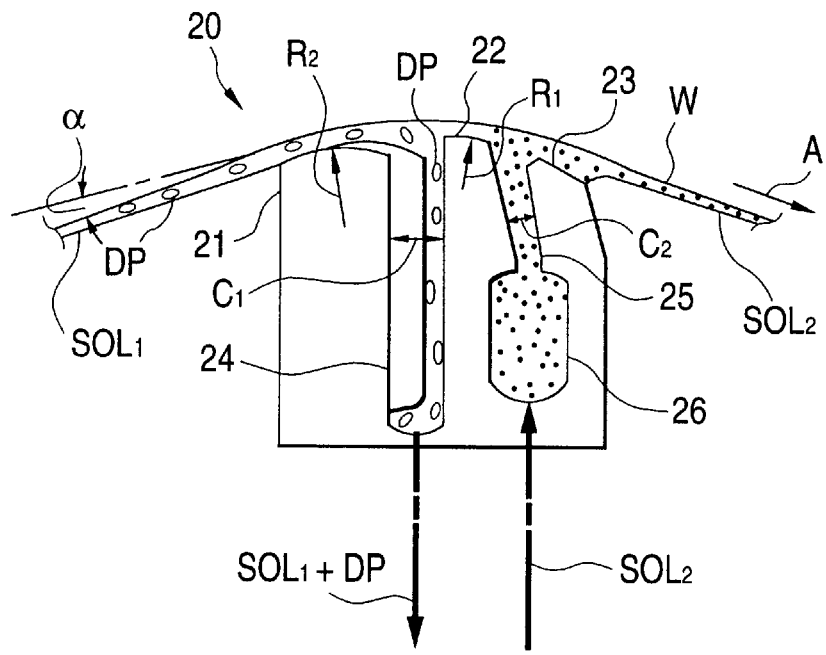
FIG. 2 is an enlarged schematic view showing the main part in FIG. 1.

An embodiment of the web cleaning and destaticizing apparatus according to the present invention will be described below in detail with respect to accompanying drawings. FIG. 1 is a schematic view diagrammatically showing a main part of the web cleaning and destaticizing apparatus 20 according to the present invention, and FIG. 2 is an enlarged schematic view showing the main part in FIG. 1.

In the web cleaning and destaticizing apparatus 20 according to the present invention, a web W is stretched between a plurality of guide rollers 4, 5 and 6 and made to run continuously in a direction of the arrow A with web tension in a range of, for example, from 10 to 20 kgf/m and at a speed of from 200 to 400 m/min. A web cleaning solution SOL1 is supplied from a web cleaning solution tank 7 through a solution-supply pump P1 and a filter F1, and preliminarily applied onto one surface of the web W to be subjected to dust removing by a web cleaning solution coater 8 having a simple structure in which, for example, solution-jet needle nozzles are arranged multistageously.

Generally, the web cleaning solution SOL1 is a single organic solution selected from the group of organic solvents such as toluene, methyl ethyl ketone, butyl acetate, xylol, cyclohexane, etc., or any combination of those organic solvents. The web cleaning solution SOL1 is applied onto one surface of the web with a quantity of application in a range of from about 10 to 30 cc/$M^2$.

Then, the web W carrying deposits DP of fine dust, etc. is conveyed together with the web cleaning solution SOL1 to an upper surface of the extrusion type web cleaning and destaticizing apparatus 20 according to the present invention which is disposed in the downstream side of the web cleaning solution coater 8.

The web cleaning and destaticizing apparatus 20 has a front edge 21, a front slit 24, a doctor blade 22, a back slit 25 and a back edge 23 which are integrally arranged in order along the running direction A of the web W.

Further, in the web cleaning and destaticizing apparatus 20, the front edge 21, the doctor blade 22 and the back edge 23 have respective upper surfaces which press, in cooperation with each other, the surface of the web W so as to permit the web W to run while the web W is curved slightly upward. The upper surface of the front edge 21 is shaped into a curve with a relatively large radius of curvature R2 so as to be able to smooth the cleaning solution SOL1 applied onto the surface of the web W. The upper surface of the doctor blade 22 is shaped into a curve with a relatively small radius of curvature R1 so as to be able to scrape off the cleaning solution SOL1 into the front slit 24 having a slit clearance C1 of about 0.5 mm. The upper surface of the back edge 23 is formed so as to be able to apply an undercoat solution SOL2, which is supplied through the back slit 25, onto the surface of the web W just after a great part of the cleaning solution SOL1 is scraped off by the upper surface of the doctor blade 22.

The web W conveyed onto the upper surface of the front edge 21 at a predetermined web incident angle α is sent to a cutting edge of the upper surface of the doctor blade 22 while being curved following the upper surface of the front edge 21 through a coating layer of the cleaning solution SOL1. However, because the upper surface of the front edge 21 has a radius of curvature larger than the radius of curvature of the upper surface of the doctor blade 22 and because the cleaning solution SOL1 has been smoothed evenly between the web and the upper surface of the front edge into a so-called smoothed state, the above-mentioned phenomenon of scattering of the cleaning solution can be prevented.

The cleaning solution SOL1 has a function for weakening the adhesive force of the deposits DP on the one surface of the web W by a chemical action. However, after the cleaning solution SOL1 applied onto the one surface of the web W is rubbed against the upper surface of the front edge 21 so as to be smoothed without the phenomenon of harmful scattering of the cleaning solution in the surrounding direction as described above, the cleaning solution SOL1 receives a strong shearing force from the cutting edge of the upper surface of the doctor blade 22. Thus, most of the cleaning solution SOL1 is separated from the one surface of the web W and scraped off into the front slit 24.

Incidentally, when the radius of curvature R2 of the upper surface of the front edge 21 is set so as to have the relation R2≧5R1 with respect to the radius of curvature R1 of the upper surface of the doctor blade 22, the allowable range of the incident angle α of the web W with respect to the upper surface of the front edge 21 can be enlarged to a range in a range of from about −7° to +5° with respect to a tangential line at an upstream side end portion of the upper surface of the front edge 21 (in which "−" indicates below the tangential line, and "+" indicates above the tangential line).

Further, preferably, the end portion of upstream side in the upper surface of the front edge 21 is C-chamfered or R-chamfered so that the incident surface of the web W is not scratched.

While only a small amount of the cleaning solution SOL1 remains on the one surface of the web W from which the cleaning solution SOL1 and the deposits DP have been scraped off by the cutting edge of the doctor blade 22, static electricity is then accumulated by the action of scraping or separating the cleaning solution SOL1. The quantity of electric charges due to the static electricity accumulated on the web W is reduced immediately by the undercoat solution SOL2. The undercoat solution SOL2 is supplied from an undercoat solution tank 9 through the undercoat supply pump P2 and the filter F2 to a pocket 6 provided, by holing, in an extruder type block of the web cleaning and destaticizing apparatus 20. Then, the undercoat solution SOL2 is introduced between the one surface of the web W and the back edge 23 through the back slit 25 having a slit clearance C2 of about 0.2 mm formed by the doctor blade 22 and the back edge 23.

The undercoat solution SOL2 contains compositions equivalent to those of the cleaning solution SOL1 or contains additives in a solvent of the same kind as the cleaning solution SOL1. For example, the undercoat solution SOL2 may be an organic solvent such as toluene, methyl ethyl ketone, butyl acetate, xylol, cyclohexane, or the like; any combination of those organic solvents; or a mixture of any of the organic solvents and a binder dissolved and dispersed therein. Additive powder such as lubricating agent, etc. may be added to the above mixture. The viscosity of the undercoat solution SOL2 is adjusted so as to be within a range of from about 1 to 10 cp in a B-type viscometer at the shearing rate of 1 $sec^{-1}$.

From the aim of the undercoat solution SOL2, a solution composition effective for removing static electricity accumulated on the web W is an essential prerequisite for the undercoat solution SOL2. Therefore, preferably, the undercoat solution SOL2 is constituted by a solution composition so that the compatibility between the undercoat solution SOL2 and the cleaning solution SOL1 slightly remaining on the one surface of the web W and wetness of a coating composition applied onto the one surface of the web W in the downstream side of the web cleaning and destaticizing apparatus 20 can be kept and accelerated so as not to reduce the quality of a coating film provided on the one surface of the web W in the downstream side of the web cleaning and destaticizing apparatus 20 according to the present invention.

Further, in order to guarantee the destaticizing effect of the undercoat solution (SOL2), the quantity of application thereof is preferably selected to be not smaller than 5 cc/m$^2$.

The following discussion of the invention and a comparative example clarifies the novel effects of the apparatus according to the present invention.

EXAMPLE

Using an apparatus according to the web cleaning and destaticizing apparatus 20 shown in FIG. 2, a web was subjected to dust-removing on the basis of the following condition.

1) Web:
Material=polyethylene-2, 6-naphthalate film
Width=500 mm
Thickness=9.5 $\mu$m
Running speed=150–400 m/min
Tension=15 kgf/m
Web incident angle $\alpha$=−10°−+10°
2) Web cleaning solution:
Composition=mixture solution of methyl ethyl ketone and cyclohexane (mixture proportion 1:9)
Quantity of application=15 cc/m$^2$
3) Web cleaning solution coater:
Type=solution-jetting needle nozzle (12.7 mm pitch×4 stages)
4) Web cleaning and destaticizing apparatus:
Front edge radius of curvature R2=5~15 mm
Front slit clearance C1=0.5 mm
Doctor blade radius of curvature R1=2 mm
Back slit clearance C2=0.2 mm
5) Undercoat solution:

| Composition = solvent; | |
|---|---|
| methyl ethyl ketone | 880 parts by weight |
| cyclohexane | 100 parts by weight |
| binder; | |
| polyester | 20 parts by weight |
| (BYRON245 (trade name)) | |
| Quantity of application = 2 ~ 10 cc/m$^2$ | |

After dust was removed in the aforementioned condition, an undercoat solution coating film, as a subbing layer, was formed and the charged potential thereof was measured. Further, the number of pinholes in the surface coated with undercoat solution film in each state sample was counted by eyes to evaluate the results of dust removal. The detailed dust-removing conditions and evaluation results were as shown in Table 1.

Although it is essentially desirable that there is not any pinhole, it is a practical target to allow presence of one or less pinhole per 1 m$^2$. Further, it is a target to suppress the quantity of electrostatic charges to be less than 10 kv, preferably not greater than 5 kv.

TABLE 1

| | Dust-removing condition | | | | | Results of evaluation | | | |
|---|---|---|---|---|---|---|---|---|---|
| Sample No. | Web speed (m/min) | Web incident angle (degree) | Radius of curvature of front edge (mm) | Radius of curvature of doctor blade (mm) | Quantity of undercoat (cc/m$^2$) | Potential of charges (kV) | Pinhole (1/m$^2$) | Scratch | Total evaluation |
| 1 | 150 | +10 | 15 | 2 | 7 | 0.5 | 1 | No | Δ |
| 2 | 150 | +7 | 15 | 2 | 7 | 0 | 1 | No | Δ |
| 3 | 150 | +5 | 15 | 2 | 7 | 0.5 | 0 | No | ○ |
| 4 | 150 | ±0 | 15 | 2 | 7 | 0 | 0 | No | ○ |
| 5 | 150 | −5 | 15 | 2 | 7 | 0 | 0 | No | ○ |
| 6 | 150 | −7 | 15 | 2 | 7 | 0 | 0 | No | ○ |
| 7 | 150 | −10 | 15 | 2 | 7 | 0 | 0 | No | Δ |
| 8 | 400 | +10 | 15 | 2 | 7 | 0.5 | 1 | No | Δ |
| 9 | 400 | +7 | 15 | 2 | 7 | 0.5 | 1 | No | Δ |
| 10 | 400 | +5 | 15 | 2 | 7 | 0.5 | 0 | No | Δ |
| 11 | 400 | ±0 | 15 | 2 | 7 | 0 | 0 | No | ○ |
| 12 | 400 | −5 | 15 | 2 | 7 | 0 | 0 | No | ○ |
| 13 | 400 | −7 | 15 | 2 | 7 | 0 | 0 | No | ○ |
| 14 | 400 | −10 | 15 | 2 | 7 | 0 | 1 | No | Δ |
| 15 | 400 | −5 | 5 | 2 | 7 | 0.5 | 1 | No | Δ |
| 16 | 400 | −5 | 10 | 2 | 7 | 0 | 0 | No | ○ |
| 17 | 400 | −5 | 15 | 2 | 2 | 2.5 | 0 | No | Δ |
| 18 | 400 | −5 | 15 | 2 | 5 | 1.0 | 0 | No | ○ |
| 19 | 400 | −5 | 15 | 2 | 10 | 0.5 | 0 | No | ○ |

Total Evaluation

○ . . . Practically problemless level at which both the dust-removing effect and the coated surface quality were excellent.

Δ . . . Practically allowable level at which both the dust-removing effect and the coated surface quality were slightly inferior.

× . . . Practically unallowable level at which both dust-removing effect and the coated surface quality were inferior.

Comparative Example

Figure 3:
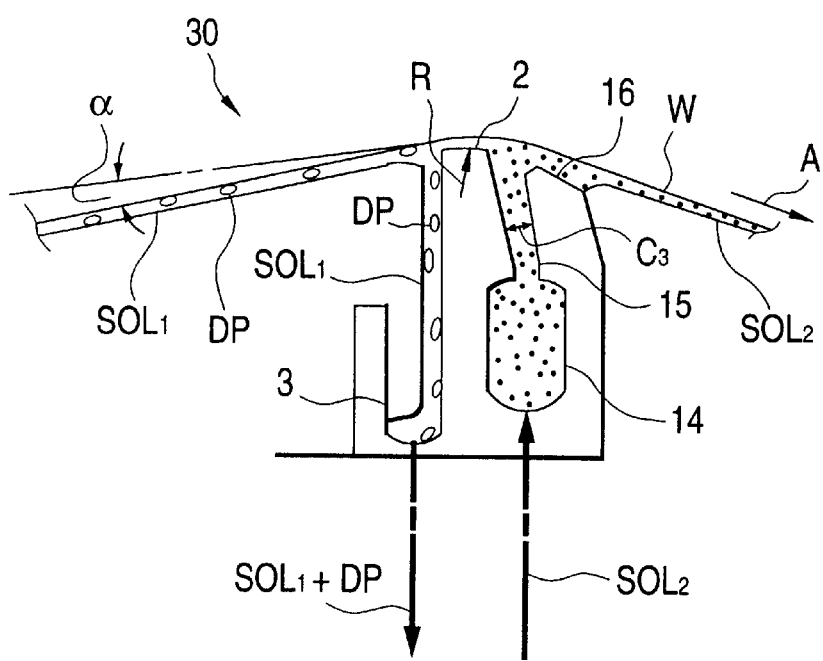
FIG. 3 is an enlarged schematic view showing a main part of a conventional web dust removing apparatus.
Figure 4:
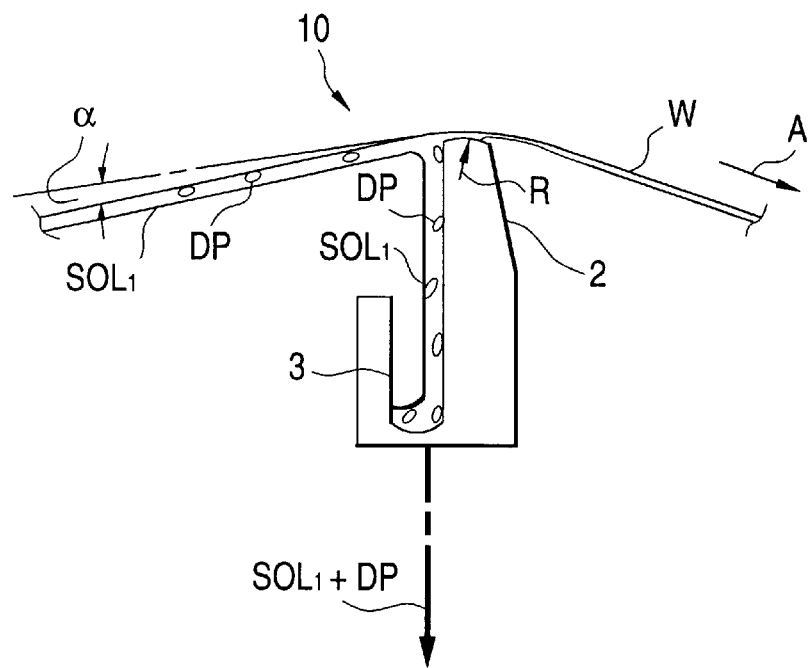
FIG. 4 is an enlarged schematic view showing a main part of another conventional web dust removing apparatus.
Figure 5:
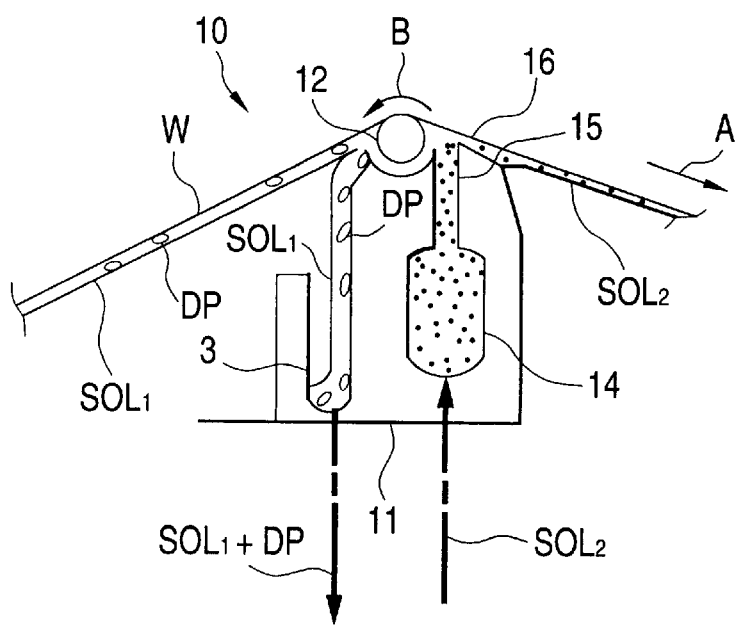
FIG. 5 is an enlarged schematic view showing a main part of another conventional web dust removing apparatus.

An apparatus according to the web cleaning and destaticizing apparatus 30 shown in FIG. 3 was used, and a web was subjected to dust-removing in the following conditions. Incidentally, the web cleaning and destaticizing apparatus 30 employs a structure of combination of elements of the conventional web cleaning and destaticizing apparatus 1 or 10 shown in FIGS. 4 or 5 except the rotary rod bar 12.

1) Web: the same as in Example of the invention

2) Web cleaning solution: the same as in Example of the invention

3) Web cleaning solution coater: the same as in Example of the invention

4) Web dust removing apparatus:

Radius of curvature of Doctor blade R1=2 mm

Back slit clearance C2=0.2 mm

5) Undercoat Solution: the same as in Example of the invention

After dust was removed in the aforementioned conditions, an undercoat solution coating film was formed, and the potential of charges was measured. Further, the number of pinholes in the undercoat solution coating film surface in each dried sample was counted by eyes to evaluate the results of dust removal. The detailed dust-removing conditions and the evaluation results are as shown in Table 2.

Δ . . . Practically allowable level at which both the dust-removing effect and the coated surface quality were slightly inferior.

× . . . Practically unallowable level at which both dust-removing effect and the coated surface quality were inferior.

It was apparent from Sample Nos. 20 to 36 in Table 2 that the conventional web dust removing apparatus 30 could not obtain such a result that all the evaluation items were satisfied at the same time though some evaluation items were good in accordance with the combination of the incident angle α of the web and the quantity of undercoat solution when the incident angle was changed in a range of from +10° to −10° and the quantity of the undercoat solution SOL2 was changed in a range of from 2 to 10 cc/m².

Contrariwise, it was apparent from Sample Nos. 1 to 19 that a wide allowable range of the web incident angle α was obtained in the web cleaning and destaticizing apparatus 20 according to the present invention. Accordingly, it was confirmed that the potential of charges, the dust-removing effect and the quality of coated surface were improved more greatly when the radius of curvature of the front edge was selected to be not smaller than five times as large as the radius of curvature of the doctor blade, and the quantity of application of the undercoat solution was selected to be not smaller than 5 cc/m².

As described above, the web cleaning and destaticizing apparatus 20 according to the present invention has the following novel effects.

The web cleaning and destaticizing apparatus 20 according to the present invention has a front edge 21, a front slit 24, a doctor blade 22, a back slit 25 and a back edge 23 which are integrally arranged in order along the running direction A of the web W which has one surface preliminarily coated with the cleaning solution SOL1 and which is stretched among the web guide rollers 4, 5 and 6 to continuously run with a predetermined amount of tension. The front edge 21, the doctor blade 22 and the back edge 23 have respective upper surfaces which press, in cooperation with,

TABLE 2

| | Dust-removing condition | | | Results of evaluation | | | |
| --- | --- | --- | --- | --- | --- | --- | --- |
| Sample No. | Web speed (m/min) | Web incident angle (degree) | Quantity of undercoat (cc/m²) | Potential of charges (kV) | Pinhole (1/m²) | Scratch | Total evaluation |
| 20 | 150 | +10 | 7 | 15 | 1 | Yes | x |
| 21 | 150 | +7 | 7 | 10 | 1 | Yes | x |
| 22 | 150 | +5 | 7 | 7 | 3 | No | x |
| 23 | 150 | ±0 | 7 | 0.5 | 2 | No | x |
| 24 | 150 | −5 | 7 | 0 | 3 | No | x |
| 25 | 150 | −7 | 7 | 0 | 10 | No | x |
| 26 | 150 | −10 | 7 | 0 | 20 | No | x |
| 27 | 400 | +10 | 7 | 20 | 0 | Yes | x |
| 28 | 400 | +7 | 7 | 10 | 1 | Yes | x |
| 29 | 400 | +5 | 7 | 5 | 3 | Yes | x |
| 30 | 400 | ±0 | 7 | 0.5 | 5 | No | x |
| 31 | 400 | −5 | 7 | 0 | 5 | No | x |
| 32 | 400 | −7 | 7 | 0 | 10 | No | x |
| 33 | 400 | −10 | 7 | 0 | 17 | No | x |
| 34 | 400 | −5 | 2 | 7 | 0 | Yes | x |
| 35 | 400 | −5 | 5 | 3 | 2 | No | x |
| 36 | 400 | −5 | 10 | 0 | 2 | No | x |

Total Evaluation

○ . . . Practically problemless level at which both dust-removing effect and the coated surface quality excellent.

each other, the surface of the web W so as to permit the web W to run while the web W is curved slightly upward. The upper surface of the front edge 21 is shaped into a curve with a relatively large radius of curvature R2 so as to be able to smooth the cleaning solution SOL1 applied onto the surface of the web W. The upper surface of the doctor blade is shaped into a curve with a relatively small radius of curvature R1 so as to be able to scrape off a great part of the cleaning solution SOL1, which has been smoothed by the upper surface of the front edge, into the front slit 24. The upper surface of the back edge 23 is formed so as to be able to apply the undercoat solution SOL2, which is supplied through the back slit 25, onto the surface of the web just after a great part of the cleaning solution SOL1 is scraped off by the upper surface of the doctor blade 22. Accordingly, the allowable range of the web incident angle α is enlarged by the front edge 21, and the cleaning solution SOL1 which is scraped off by the doctor blade 22 can be collected into the front slit 24 without scattering in the surrounding directions.

Further, the undercoat solution SOL2 is applied onto the surface of the web W by the back edge 23 just after the web W has passed the upper surface of the doctor blade 22, so that static electricity accumulated by the scraping-off of the cleaning solution SOL1 can be eliminated rapidly and efficiently.

Further, the undercoat solution SOL2 containing compositions equivalent to those of the cleaning solution SOL1 or containing additives in a solvent of the same kind as that of the cleaning solution SOL1 is employed for the web cleaning and destaticizing apparatus 20 according to the present invention, so that the compatibility between the undercoat solution SOL2 and the cleaning solution SOL1 slightly remaining on the surface of the web W and the wetness of another coating solution applied by a coater in the downstream side is kept and accelerated. As a result, the quality of the coating film can be improved.

Further, the undercoat solution SOL2 is applied in the web cleaning and destaticizing apparatus 20 according to the present invention by a quantity of application of at least 5 cc/m$^2$, so that static electricity accumulated due to the scraping-off of the cleaning solution SOL1 can be eliminated more rapidly and more efficiently.

Further, the radius of curvature R2 of the upper surface of the front edge 21 in the web cleaning and destaticizing apparatus 20 according to the present invention is set to have the relation R2≧5R1 with respect to the radius of curvature R1 of the upper surface of the doctor blade 22, so that the allowable range of the incident angle α of the web Wa can be widened to a range of from −7° to 5° in which the apparatus is handled stably and easily even by a manual operation.

Further, the incident angle α of the web with respect to the upper surface of the front edge 21 in the web cleaning and destaticizing apparatus 20 according to the present invention is set to be within a range of from −7° to 5° with respect to a tangential line at the upstream side end portion of the upper surface of the front edge 21, so that the allowable range of the incident angle α of the web can be widened so that the apparatus can be set up easily by manual operation.

Further, the upstream side end portion of the upper surface of the front edge 21 in the web cleaning and destaticizing apparatus 20 according to the present invention is C-chamfered or R-chamfered, so that not only the setting of the incident angle α of the web is made easier but also the occurrence of scratches caused by the contact between the upstream side end portion and the incident web W can be suppressed.

The present invention is based on Japanese Patent Application No. Hei. 9-239903, which is incorporated herein by reference.

While only certain embodiments of the invention have been specifically describe herein, it will be apparent that numerous modification may be made thereto without departing from the spirit and scope of the invention.

What is claimed is:

1. A web cleaning and destaticizing apparatus for cleaning and destaticizing a web which has one surface preliminarily coated with a cleaning solution and is guided and tensioned by guide rollers constituting a running route of said web, wherein said web runs continuously along said running route with a predetermined tension, said apparatus comprising:
   a front edge having an upper surface which is brought in pressure-contact with said coated layer of said web and has a first radius (R2) of curvature in a cross-section;
   a front slit for collecting said cleaning solution to be scraped off;
   a doctor blade for scraping a part of said cleaning solution off, said doctor blade having an upper surface which is brought in pressure-contact with said coated layer of said web and has a second radius (R1) of curvature in the cross-section;
   a back slit for supplying an undercoat solution to said web; and
   a back edge for coating said web with said undercoat solution immediately after said part of said cleaning solution is scraped off, said back edge being in pressure-contact with a coated layer of said web;
   wherein said front edge, said front slit, said doctor blade, said back slit and said back edge are integrally and continuously disposed in order along a running direction of said web, and
   wherein said first radius (R2) of curvature is larger than said second radius (R1) of curvature.

2. The web cleaning and destaticizing apparatus according to claim 1, wherein said second radius (R1) of curvature is at least five times as large as said first radius of curvature (R2).

3. The web cleaning and destaticizing apparatus according to claim 2, wherein said web cleaning and destaticizing apparatus is positioned, with respect to said web, such that web incident angle defined by intersecting said web and a tangential line of a cutting edge which is disposed at an upstream side end portion of the upper surface of said front edge is in a range from −7° to +5°, where "−" indicates below said tangential line and "+" indicates above said tangential line.

4. The web cleaning and destaticizing apparatus according to claim 1, wherein an upstream-side end portion, at which said upper surface of said front edge is brought in pressure-contact with said coated layer of said web, is chamfered.

5. The web cleaning and destaticizing apparatus according to claim 1, further comprising an undercoat solution supply unit for supplying said undercoat solution to said back slit, wherein a quantity of application of said undercoat solution to said web is at least 5 cc/m$^2$.

6. The web cleaning and destaticizing apparatus according to claim 1, wherein said cleaning solution comprises a solvent, wherein said undercoat solution includes at least one of a composition equivalent to said cleaning solution and a composition containing additives in a solvent of the same kind as said cleaning solution.

7. The web cleaning and destaticizing apparatus according to claim 2, wherein an upstream-side end portion, at which said upper surface of said front edge is brought in pressure-contact with said coated layer of said web, is chamfered.

8. The web cleaning and destaticizing apparatus according to claim 7, further comprising an undercoat solution supply unit for supplying said undercoat solution to said back slit, wherein a quantity of application of said undercoat solution to said web is at least 5 cc/m$^2$.

9. The web cleaning and destaticizing apparatus according to claim 8, wherein said cleaning solution comprises a solvent, wherein said undercoat solution includes one of a composition equivalent to said cleaning solution and a composition containing additives in a solvent of the same kind as said cleaning solution.

10. The web cleaning and destaticizing apparatus according to claim 5, wherein said cleaning solution comprises a solvent, wherein said undercoat solution includes one of a composition equivalent to said cleaning solution and a composition containing additives in a solvent of the same kind as said cleaning solution.

* * * * *